(12) United States Patent
Kushalad et al.

(10) Patent No.: US 12,289,229 B2
(45) Date of Patent: *Apr. 29, 2025

(54) SEGMENT IDENTIFIERS THAT SUPPORT END-TO-END SEGMENT ROUTING WITH COLOR EXTENDED COMMUNITY AND BORDER GATEWAY PROTOCOL VIRTUAL PRIVATE NETWORK OPTION B

(71) Applicant: Juniper Networks, Inc., Sunnyvale, CA (US)

(72) Inventors: Kiran Kushalad, San Jose, CA (US); Rajendra Prasad Bollam, Mountain House, CA (US); Rajesh Shetty Manur, Bengaluru (IN); Salih K A, Thodupuzha (IN); Shraddha Hegde, Bangalore (IN); Sri Karthik Goud Gadela, Campbell, CA (US); Swamy Sadashivaiah Kananda, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/327,392

(22) Filed: Jun. 1, 2023

(65) Prior Publication Data

US 2023/0327974 A1 Oct. 12, 2023

Related U.S. Application Data

(63) Continuation of application No. 17/448,117, filed on Sep. 20, 2021, now Pat. No. 11,706,121.

(51) Int. Cl.
*H04L 45/02* (2022.01)
*H04L 45/00* (2022.01)
*H04L 45/74* (2022.01)

(52) U.S. Cl.
CPC ............. *H04L 45/02* (2013.01); *H04L 45/20* (2013.01); *H04L 45/74* (2013.01); *H04L 2212/00* (2013.01)

(58) Field of Classification Search
None
See application file for complete search history.

(56) References Cited

U.S. PATENT DOCUMENTS

| 8,611,359 | B1 * | 12/2013 | Kompella | ............... | H04L 45/04 |
| | | | | | 370/401 |
| 10,142,223 | B2 * | 11/2018 | Bickhart | ................ | H04L 45/02 |

(Continued)

FOREIGN PATENT DOCUMENTS

| WO | 2019005949 A1 | 1/2019 |
| WO | 2020238809 A1 | 12/2020 |

*Primary Examiner* — Xavier S Wong
(74) *Attorney, Agent, or Firm* — Harrity & Harrity, LLP

(57) ABSTRACT

A first network device may receive an advertisement that includes a prefix for a second network device, wherein the advertisement is destined for a third network device. The first network device may determine, based on a network topology, whether a next hop is one hop away or multiple hops away. The first network device may selectively modify the advertisement to include a first segment identifier, based on the next hop being one hop away and to generate a first modified advertisement, or may modify the advertisement to include a second segment identifier, based on the next hop being multiple hops away and to generate a second modified advertisement. The first network device may forward the first modified advertisement or the second modified advertisement toward the third network device.

20 Claims, 11 Drawing Sheets

(56) References Cited

U.S. PATENT DOCUMENTS

| | | | |
|---|---|---|---|
| 11,706,121 B2 * | 7/2023 | Kushalad | H04L 45/02 370/255 |
| 2014/0254596 A1 | 9/2014 | Filsfils et al. | |
| 2019/0149449 A1 * | 5/2019 | Morris | H04L 45/22 709/245 |
| 2019/0199628 A1 * | 6/2019 | Amin | H04L 45/74 |
| 2020/0120408 A1 | 4/2020 | Boyd et al. | |
| 2020/0127913 A1 * | 4/2020 | Filsfils | H04L 45/741 |
| 2020/0186458 A1 | 6/2020 | Farag et al. | |
| 2021/0083973 A1 | 3/2021 | Peng et al. | |
| 2021/0092048 A1 | 3/2021 | Dutta | |
| 2021/0112034 A1 * | 4/2021 | Sundararajan | H04L 49/25 |
| 2021/0306260 A1 | 9/2021 | Watts et al. | |
| 2021/0320863 A1 * | 10/2021 | Xia | H04L 45/42 |
| 2023/0091393 A1 | 3/2023 | Kushalad et al. | |

* cited by examiner

SEGMENT IDENTIFIERS THAT SUPPORT END-TO-END SEGMENT ROUTING WITH COLOR EXTENDED COMMUNITY AND BORDER GATEWAY PROTOCOL VIRTUAL PRIVATE NETWORK OPTION B

RELATED APPLICATION

This application is a continuation of U.S. patent application Ser. No. 17/448,117, filed Sep. 20, 2021, which is incorporated herein by reference in its entirety.

BACKGROUND

Segment routing (SR) allows source network devices to steer packets through segment routing paths. Segment routing may be implemented over Internet protocol version 6 (IPv6) or multiprotocol label switching (MPLS). Segment routing implemented over IPv6 may be referred to as SRv6.

SUMMARY

Some implementations described herein relate to a method. The method may include receiving, by a first network device, an advertisement that includes a prefix for a second network device, where the advertisement may be destined for a third network device. The method may include determining, based on a network topology, whether a next hop is one hop away or multiple hops away. The method may include selectively modifying the advertisement to include a first segment identifier, based on the next hop being one hop away and to generate a first modified advertisement, or modifying the advertisement to include a second segment identifier, based on the next hop being multiple hops away and to generate a second modified advertisement. The method may include forwarding the first modified advertisement or the second modified advertisement toward the third network device.

Some implementations described herein relate to a first network device. The first network device may include one or more memories and one or more processors. The one or more processors may be configured to receive an advertisement that includes a prefix for a second network device, where the advertisement may be destined for a third network device. The one or more processors may be configured to determine, based on a network topology, whether a next hop is one hop away or multiple hops away. The one or more processors may be configured to selectively modify the advertisement to include a first segment identifier, based on the next hop being one hop away and to generate a first modified advertisement, or modify the advertisement to include a second segment identifier, based on the next hop being multiple hops away and to generate a second modified advertisement. The one or more processors may be configured to forward the first modified advertisement or the second modified advertisement toward the third network device.

Some implementations described herein relate to a non-transitory computer-readable medium that stores a set of instructions for a first network device. The set of instructions, when executed by one or more processors of the first network device, may cause the first network device to receive an advertisement that includes a prefix for a second network device, where the advertisement may be destined for a third network device. The set of instructions, when executed by one or more processors of the first network device, may cause the first network device to determine, based on a network topology, whether a next hop is one hop away or multiple hops away. The set of instructions, when executed by one or more processors of the first network device, may cause the first network device to selectively modify the advertisement to include a first segment identifier, based on the next hop being one hop away and to generate a first modified advertisement, or modify the advertisement to include a second segment identifier, based on the next hop being multiple hops away and to generate a second modified advertisement. The set of instructions, when executed by one or more processors of the first network device, may cause the first network device to forward the first modified advertisement or the second modified advertisement toward the third network device, and receive a packet transmitted by the third network device and destined for the second network device. The set of instructions, when executed by one or more processors of the first network device, may cause the first network device to determine whether the packet is associated with the first segment identifier or the second segment identifier, and update a destination address of the packet to include the second segment identifier when the packet is associated with the first segment identifier. The set of instructions, when executed by one or more processors of the first network device, may cause the first network device to forward the packet on an outgoing interface toward the second network device.

DETAILED DESCRIPTION

Figure 1A:
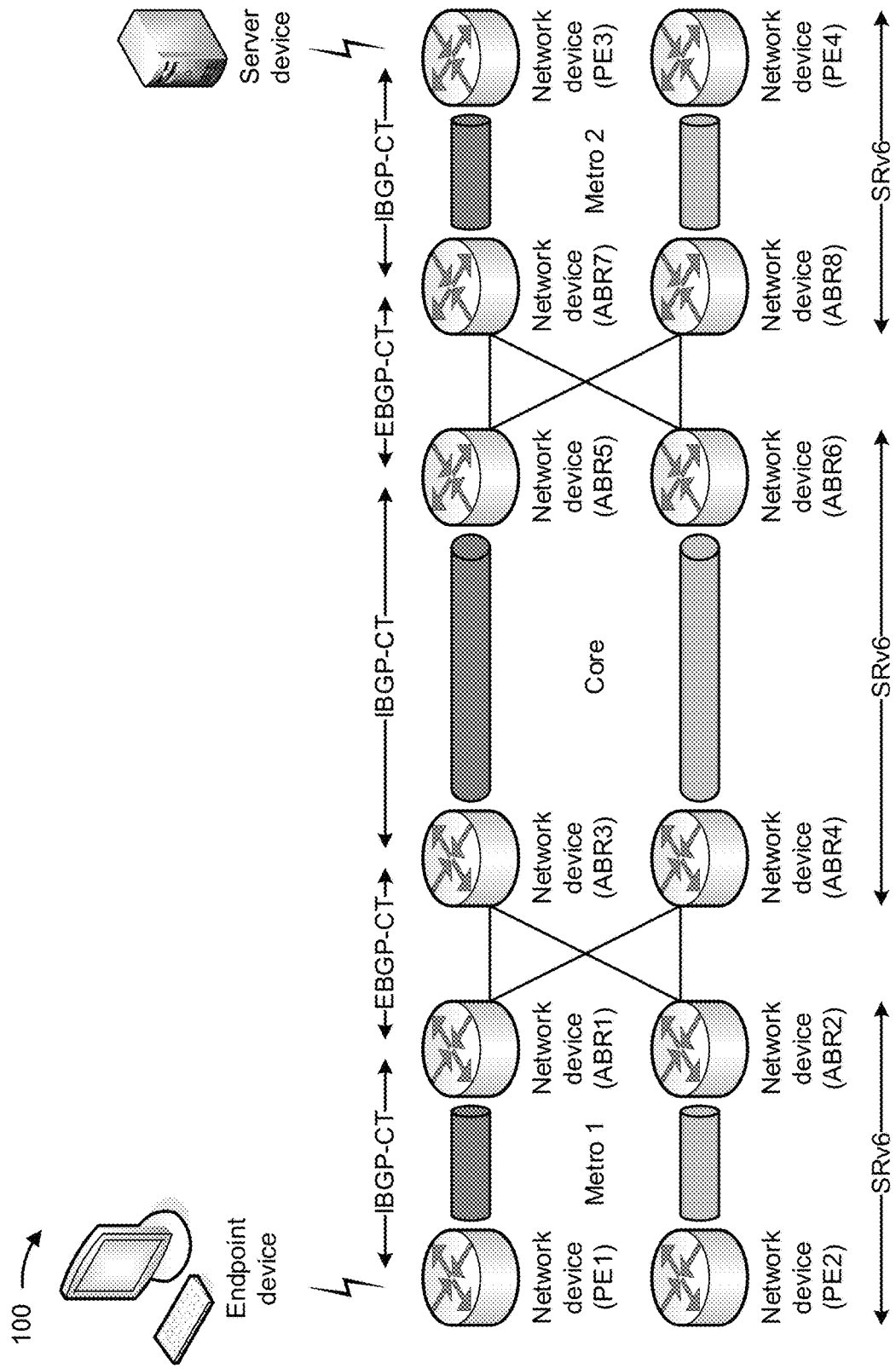
FIGS. 1A-1G are diagrams of an example associated with providing segment identifiers (SIDs) that support end-to-end (E2E) segment routing with color extended community and border gateway protocol (BGP) virtual private network (VPN) option B.

The following detailed description of example implementations refers to the accompanying drawings. The same reference numbers in different drawings may identify the same or similar elements.

Current techniques for providing an intent-based inter-domain path (e.g., a seamless segment routing path) may fail to adhere to several end-to-end constraints. For example, a seamless segment routing path may fail to adhere to latency constraints, delay variation constraints, link loss constraints, bandwidth constraints, link inclusion and exclusion constraints, network device inclusion and exclusion constraints, domain inclusion and exclusion constraints, and/or the like. Failure to adhere to one or more of these constraints may result in delayed traffic transmission through a network, lost traffic, poor user experience, and/or the like. Thus, current techniques for providing a seamless segment routing path consume computing resources (e.g., processing resources, memory resources, communication resources, and/or the like), networking resources, and/or the like, are associated with delaying traffic transmission through a network due to the seamless segment routing path, losing traffic due to the seamless segment routing path, handling the lost traffic caused by the seamless segment routing path, and/or the like.

Some implementations described herein relate to a network device that provides SIDs that support E2E segment routing with color extended community and BGP VPN option B. A color extended community is an eight-octet value, representing a color, that is also divided into two sections. The first two octets of the community encode a type field while the last six octets carry a unique set of data in a format defined by the type field. BGP VPN option B may ensure complete internal BGP (iBGP) isolation between data centers and a wide area network. When BGP advertises a particular route to a network device (e.g., an area border router), BGP also distributes label which is mapped to the particular route. For example, a first network device may receive an advertisement that includes a prefix for a second network device, wherein the advertisement is destined for a third network device. The first network device may determine, based on a network topology, whether a next hop is one hop away or multiple hops away. The first network device may selectively modify the advertisement to include a first segment identifier, based on the next hop being one hop away and to generate a first modified advertisement, or may modify the advertisement to include a second segment identifier, based on the next hop being multiple hops away and to generate a second modified advertisement. The first network device may forward the first modified advertisement or the second modified advertisement toward the third network device.

In this way, the network device provides SIDs that support E2E segment routing with color extended community and BGP VPN option B. A first SRv6 SID (e.g., an END.REPLACEB6 SID) may cause the network device to replace a destination address with a new SID and to encapsulate a new SRv6 header. A second SRv6 SID (e.g., an END.REPLACE SID) may cause the network device to replace a destination address with a new SID and to forward a packet on an outgoing interface. A third SRv6 SID (e.g., an END.DB6 SID) may cause the network device to decapsulate a received SRv6 header and to bind (e.g., encapsulate) a new SRv6 header. The SIDs provided by the network device adhere to several end-to-end constraints associated with providing a seamless segment routing path. Thus, the network device conserves computing resources, networking resources, and/or that like that would otherwise have been consumed by delaying traffic transmission through a network due to the seamless segment routing path, losing traffic due to the seamless segment routing path, handling the lost traffic caused by the seamless segment routing path, and/or the like.

FIGS. 1A-1G are diagrams of an example 100 associated with providing SIDs that support E2E segment routing with color extended community and BGP VPN option B. As shown in FIGS. 1A-1G, example 100 includes an endpoint device, a network of network devices, and a server device. The network devices may include provider edge (PE) devices, area border routers (ABRs), and/or the like. Further details of the endpoint device, the network, the network devices, and the server device are provided elsewhere herein.

As shown in FIG. 1A, a first PE device (PE1) may be associated with a first ABR (ABR1) via an internal border gateway protocol (iBGP) classful transport (CT) core network, and a second PE device (PE2) may be associated with a second ABR (ABR2) via an SRv6 first metropolitan area network (Metro 1). Each of the first ABR and the second ABR may be interconnected with a third ABR (ABR3) and a fourth ABR (ABR4) via an external BGP (eBGP)-CT. The third ABR may be associated with a fifth ABR (ABR5) via an iBGP-CT core network, and the fourth ABR may be associated with a sixth ABR (ABR6) via SRv6. Each of the fifth ABR and the sixth ABR may be interconnected with a seventh ABR (ABR7) and an eighth ABR (ABR8) via an eBGP-CT. The seventh ABR may be associated with a third PE device (PE3) via an iBGP-CT core network, and the eighth ABR may be associated with a fourth PE device (PE4) via an SRv6 second metropolitan area network (Metro 2). The endpoint device may communicate with the first PE device and the server device may communicate with the third PE device.

Figure 1B:
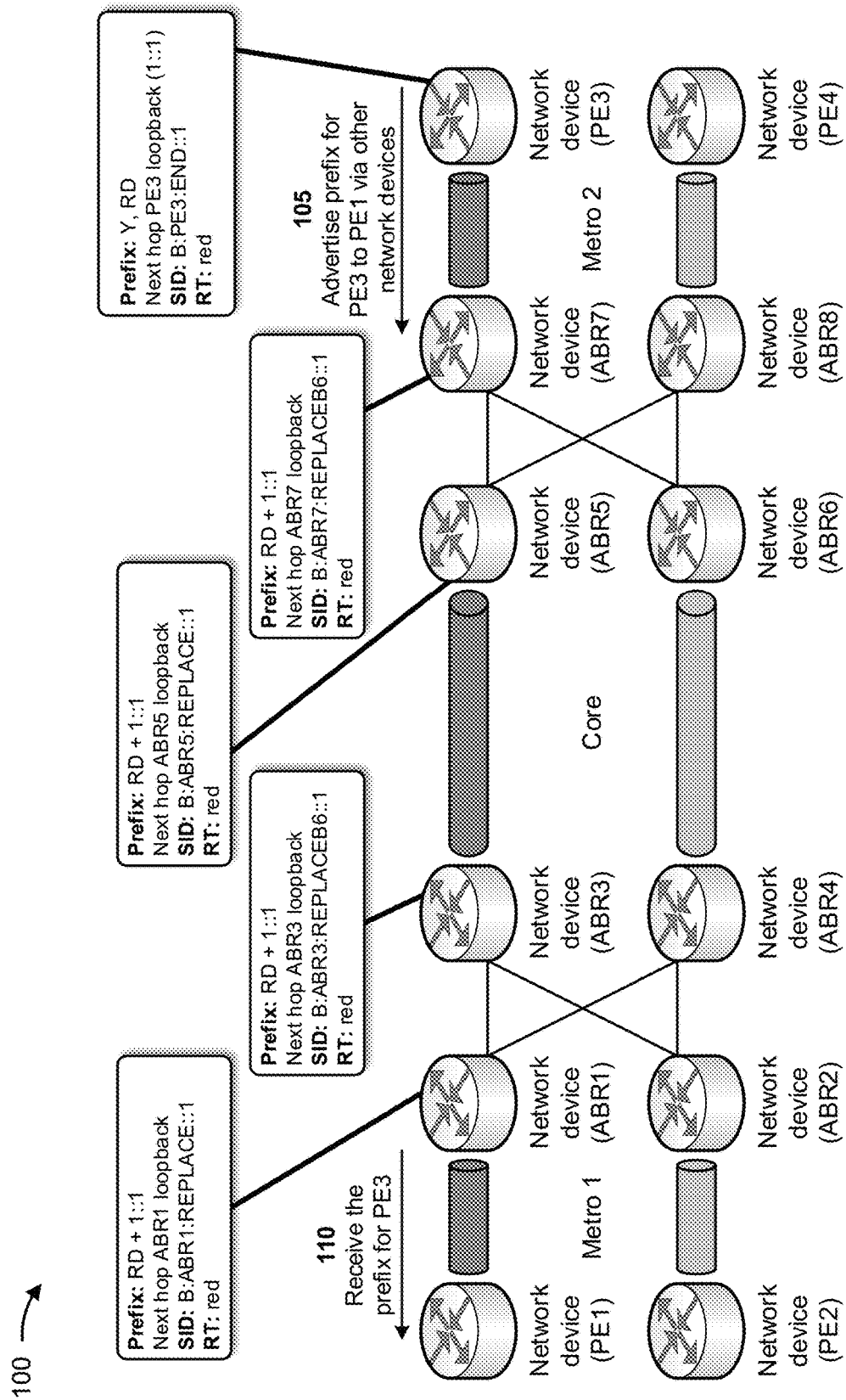

As shown in FIG. 1B, and by reference number 105, the third PE device may advertise a prefix for the third PE device to the first PE device via the other network devices. For example, the third PE device may generate a first advertisement that includes the prefix (e.g., Y, a color, such as red (RD), a next hop PE3 loopback (1::1)), a SID (e.g., B:PE3:END::1), and a route target (RT) (e.g., a color, such as red). The third PE device may provide the first advertisement to the seventh ABR, and the seventh ABR may generate a second advertisement based on the first advertisement. The second advertisement may include the prefix (e.g., RD+1::1, a next hop ABR7 loopback), a SID (e.g., B:ABR7:REPLACEB6::1), and an RT (e.g., red). The SID in the second advertisement may include a SID type (e.g., END:REPLACEB6) since a next hop for the seventh ABR is more than one hop away from the seventh ABR.

The seventh ABR may provide the second advertisement to the fifth ABR, and the fifth ABR may generate a third advertisement based on the second advertisement. The third advertisement may include the prefix (e.g., RD+1::1, a next hop ABR5 loopback), a SID (e.g., B:ABR5:REPLACE::1), and an RT (e.g., red). The SID in the third advertisement may include a SID type (e.g., END:REPLACE) since a next hop for the fifth ABR is one hop away from the fifth ABR. The fifth ABR may provide the third advertisement to the third ABR, and the third ABR may generate a fourth advertisement based on the third advertisement. The fourth advertisement may include the prefix (e.g., RD+1::1, a next hop ABR3 loopback), a SID (e.g., B:ABR3:REPLACEB6::1), and an RT (e.g., red). The SID in the fourth advertisement may include a SID type (e.g., END:REPLACEB6) since a next hop for the third ABR is more than one hop away from the third ABR.

The third ABR may provide the fourth advertisement to the first ABR, and the first ABR may generate a fifth advertisement based on the fourth advertisement. The fifth advertisement may include the prefix (e.g., RD+1::1, a next hop ABR1 loopback), a SID (e.g., B:ABR1:REPLACE::1), and an RT (e.g., red). The SID in the fifth advertisement may include a SID type (e.g., END:REPLACE) since a next hop for the first ABR is one hop away from the first ABR. The first ABR may provide the fifth advertisement to the first PE device. As further shown in FIG. 1B, and by reference number 110, the first PE device may receive the fifth advertisement, with the prefix for the third PE device, from the first ABR.

Figure 1C:
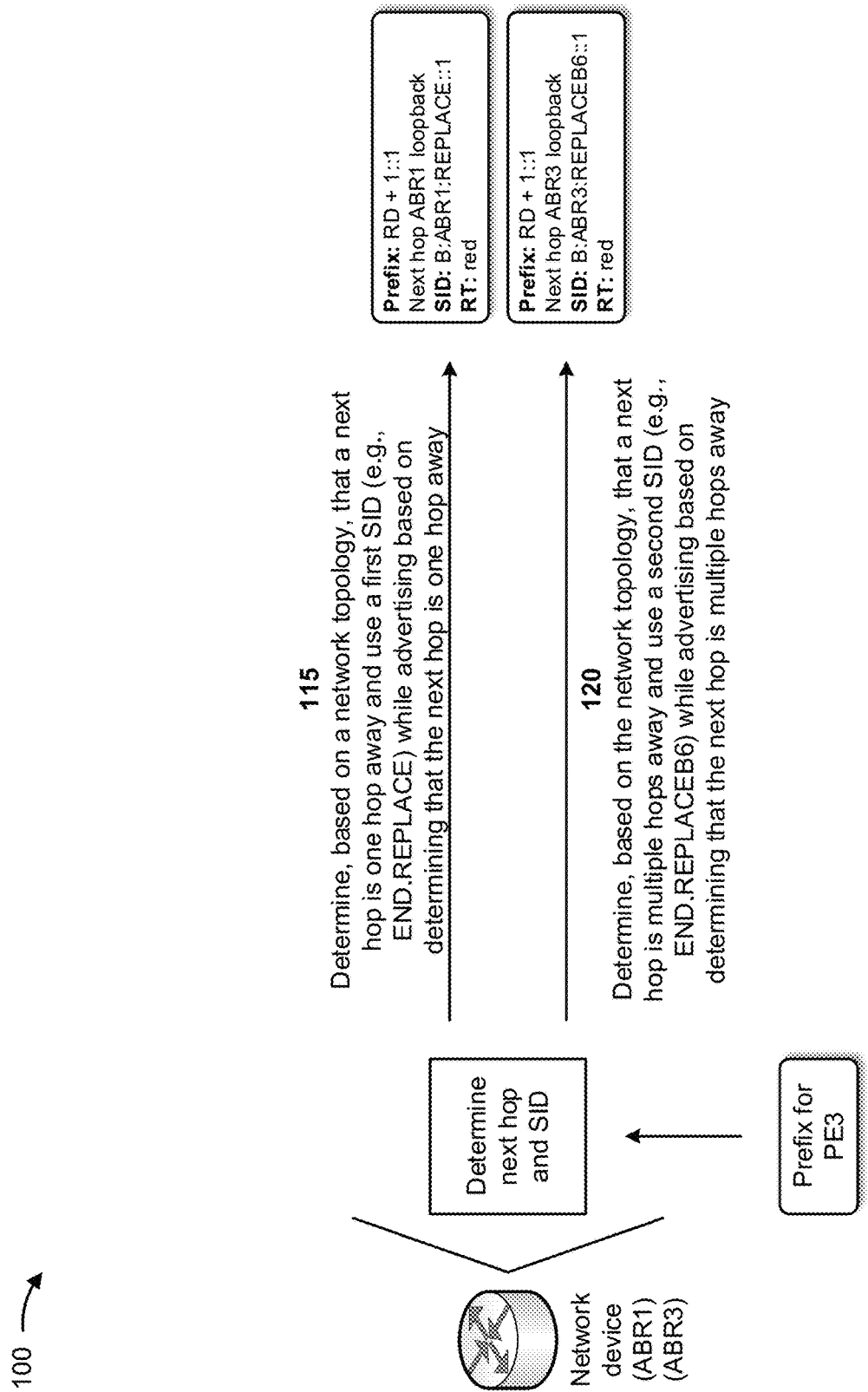

As shown in FIG. 1C, and by reference number 115, the first ABR may determine, based on a network topology, that a next hop is one hop away and may use a first SID (e.g., END.REPLACE) while advertising based on determining that the next hop is one hop away. For example, the first ABR may determine, based on the network topology, that a next hop for the first ABR is one hop away from the first ABR. The first ABR may generate the fifth advertisement based on the fourth advertisement. The fifth advertisement may include the prefix (e.g., RD+1::1, a next hop ABR1 loopback), the first SID (e.g., B:ABR1:REPLACE::1), and the RT (e.g., red). The SID in the fifth advertisement may include the first SID (e.g., END:REPLACE) since a next hop for the first ABR is one hop away from the first ABR.

As further shown in FIG. 1C, and by reference number 120, the third ABR may determine, based on the network topology, that a next hop is multiple hops away and may use a second SID (e.g., END.REPLACEB6) while advertising based on determining that the next hop is multiple hops away. For example, the third ABR may determine, based on the network topology, that a next hop for the third ABR is multiple hops (e.g., more than one hop) away from the third ABR. The third ABR may generate the fourth advertisement based on the third advertisement. The fourth advertisement may include the prefix (e.g., RD+1::1, a next hop ABR3 loopback), the second SID (e.g., B:ABR3:REPLACEB6::1), and the RT (e.g., red). The SID in the fourth advertisement may include the second SID (e.g., END:REPLACEB6) since a next hop for the third ABR is more than one hop away from the third ABR.

Figure 1D:
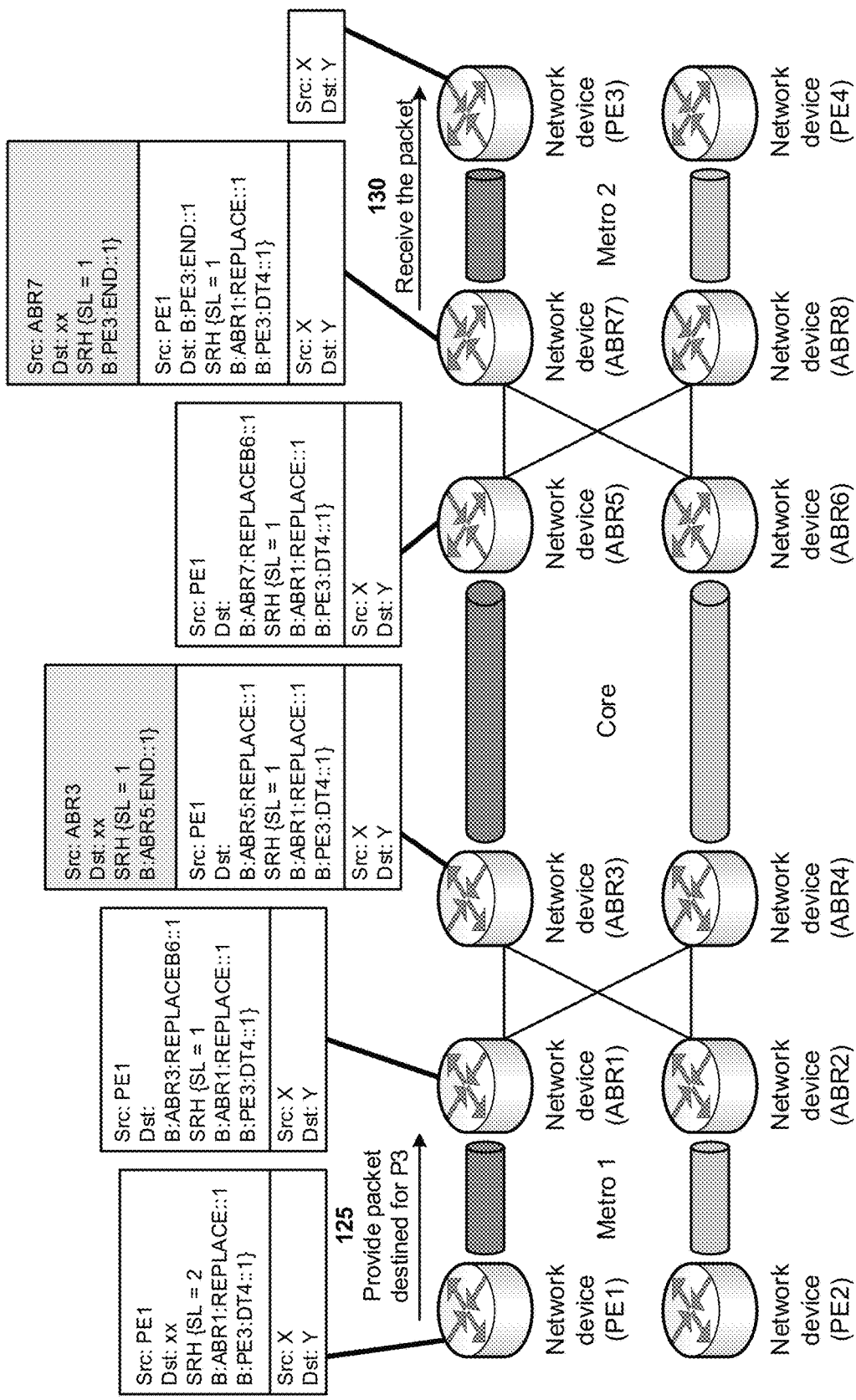

As shown in FIG. 1D, and by reference number 125, the first PE device may provide a packet, destined for the third PE device, to the first ABR. For example, the first PE device may receive the packet from the endpoint device. The packet may be destined for the server device, via the third PE device. The packet may include a source address (e.g., X) and a destination address (e.g., Y) and a header that includes a source address (e.g., PE1), a first destination address (e.g., xx), and a first segment routing header (SRH) (e.g., a segment list (SL)=2 B:ABR1:REPLACE::1 B:PE3:DT4::1). The first SRH may be associated with the first SID (e.g., END:REPLACE) since a next hop for the first PE device is one hop away from the first PE device. The first PE device may provide the packet to the first ABR.

The first ABR may receive the packet and may determine, based on the first SRH, that the packet is associated with the first SID (e.g., END:REPLACE). The first ABR may update the first destination address to a second destination address that includes the second SID (e.g., END:REPLACEB6) and may update the first SRH to a second SRH that includes the second SID (e.g., END:REPLACEB6) based on determining that the packet is associated with the first SID. The updated header of the packet may include the second destination address (e.g., B:ABR3:REPLACEB6::1) and the second SRH (e.g., SL=1 B:ABR1:REPLACE::1 B:PE3:DT4::1). The first ABR may forward the packet with the updated header to the third ABR via an outgoing interface of the first ABR. In some implementations, the first ABR may determine, based on the network topology, whether a next hop limit is less than or equal to one, and may discard the packet when the next hop limit is less than or equal to one. The first ABR may decrement the next hop limit by one when the next hop limit is greater than one.

The third ABR may receive the packet with the updated header and may determine, based on the second SRH, that the packet is associated with the second SID (e.g., END:REPLACEB6). The third ABR may update the second destination address to a third destination address that includes the first SID (e.g., END:REPLACE) based on determining that the packet is associated with the second SID. The updated header of the packet may include the third destination address (e.g., B:ABR5:REPLACE::1) and the second SRH (e.g., SL=1 B:ABR1:REPLACE:1 B:PE3:DT4::1). The third ABR may encapsulate the packet, with an encapsulation header, to generate an encapsulated packet. The encapsulation header may include a source address (e.g., ABR3), a destination address (e.g., xx), and an SRH (e.g., SL=1 B:ABR5:END::1). The third ABR may forward the encapsulated packet with the updated header to the fifth ABR.

In some implementations, the third ABR may determine, based on the network topology, whether a next hop limit is less than or equal to one, and may discard the packet when the next hop limit is less than or equal to one. The third ABR may decrement the next hop limit by one when the next hop limit is greater than one. In some implementations, when encapsulating the packet, the third ABR may generate a header with a segment routing header, and may provide data identifying a security association, a destination address, a payload length, a traffic class, a hop limit, flow label fields, and a next hop value in the header. In some implementations, when forwarding the encapsulated packet to the fifth ABR, the third ABR may provide the encapsulated packet to an IPV6 module of the third ABR, and the IPV6 module may transmit the encapsulated packet to the fifth ABR.

The fifth ABR may receive the encapsulated packet with the updated header and may decapsulate the encapsulated packet. The fifth ABR may determine that the packet is associated with the first SID (e.g., END:REPLACE). The fifth ABR may update the third destination address to a fourth destination address that includes the second SID (e.g., END:REPLACEB6) based on determining that the packet is associated with the first SID. The updated header of the packet may include the fourth destination address (e.g., B:ABR7:REPLACEB6::1) and the second SRH (e.g., SL=1 B:ABR1:REPLACE::1 B:PE3:DT4::1). The fifth ABR may forward the packet with the updated header to the seventh ABR via an outgoing interface of the fifth ABR.

The seventh ABR may receive the packet with the updated header and may determine that the packet is associated with the second SID (e.g., END:REPLACEB6). The seventh ABR may update the fourth destination address to a fifth destination address based on determining that the packet is associated with the second SID. The updated header of the packet may include the fifth destination address (e.g., B:PE3:END::1) and the second SRH (e.g., SL=1 B:ABR1:REPLACE::1 B:PE3:DT4::1). The seventh ABR may encapsulate the packet, with an encapsulation header, to generate an encapsulated packet. The encapsulation header may include a source address (e.g., ABR7), a destination address (e.g., xx), and an SRH (e.g., SL=1 B:PE3:END::1). The seventh ABR may forward the encapsulated packet with the updated header to the third PE device.

As further shown in FIG. 1D, and by reference number 130, the third PE device may receive the encapsulated packet with the updated header and may decapsulate the encapsulated packet. The third PE device may remove the updated header from the packet and may forward the packet on to a final destination (e.g., the server device).

Figure 1E:
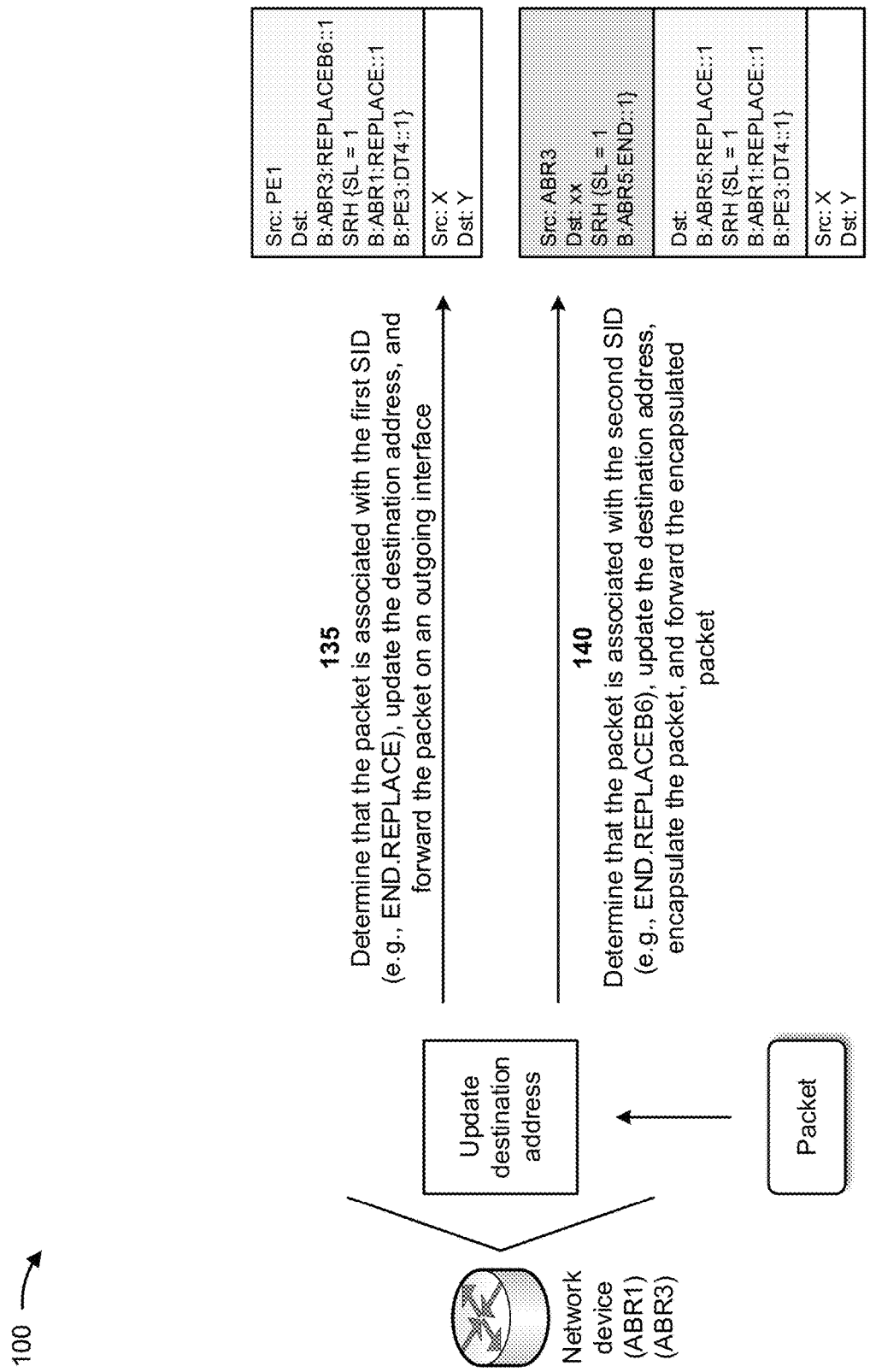

As shown in FIG. 1E, and by reference number 135, the first ABR may determine that the packet is associated with the first SID (e.g., END.REPLACE), may update the destination address to the second SID, and may forward the packet on an outgoing interface. For example, the first ABR may determine, based on the first SRH of a packet, that the packet is associated with the first SID (e.g., END:REPLACE). The first ABR may update the first destination address to the second destination address that includes the second SID (e.g., END:REPLACEB6) and may update the first SRH to the second SRH that includes the second SID (e.g., END:REPLACEB6) based on determining that the packet is associated with the first SID. The updated header of the packet may include the second destination address (e.g., B:ABR3:REPLACEB6:1) and the second SRH (e.g., SL=1 B:ABR1:REPLACE::1 B:PE3:DT4::1). The first ABR may forward the packet with the updated header to the third ABR via an outgoing interface of the first ABR.

As further shown in FIG. 1E, and by reference number 140, the third ABR may determine that the packet is associated with the second SID (e.g., END.REPLACEB6), may update the destination address to the first SID, may encapsulate the packet, and may forward the encapsulated packet. For example, the third ABR may determine, based on the second SRH, that the packet is associated with the second SID (e.g., END:REPLACEB6). The third ABR may update the second destination address to the third destination address that includes the first SID (e.g., END:REPLACE) based on determining that the packet is associated with the second SID. The updated header of the packet may include the third destination address (e.g., B:ABR5:REPLACE::1) and the second SRH (e.g., SL=1 B:ABR1:REPLACE::1 B:PE3:DT4::1). The third ABR may encapsulate the packet, with an encapsulation header, to generate an encapsulated packet. The encapsulation header may include a source address (e.g., ABR3), a destination address (e.g., xx), and an SRH (e.g., SL=1 B:ABR5:END::1). The third ABR may forward the encapsulated packet with the updated header to the fifth ABR.

Figure 1F:
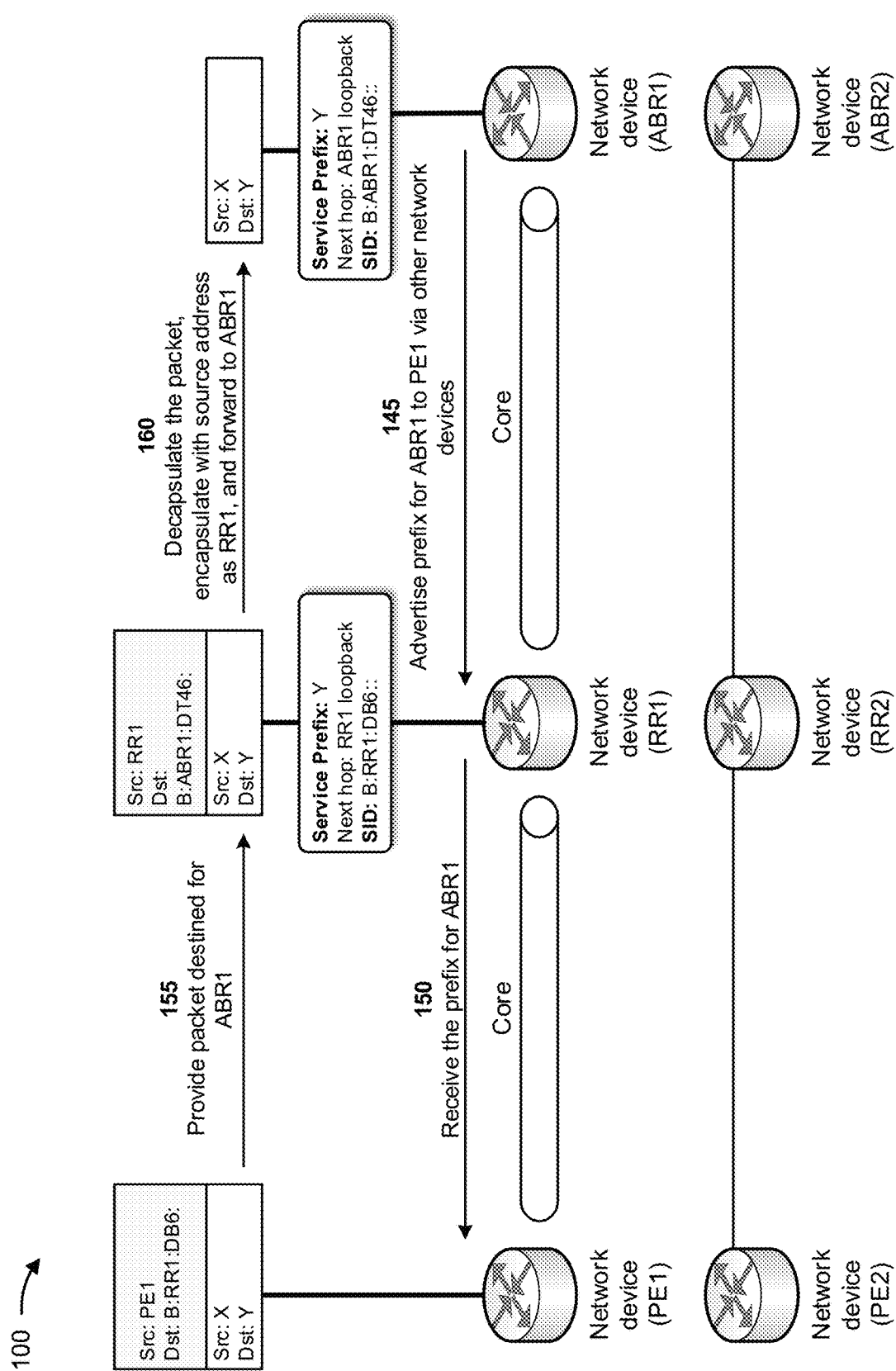

As shown in FIG. 1F, a first PE device (PE1) may be associated with a first route reflector (RR) device (RR1) and a first ABR (ABR1), via a core network. A second PE device may be associated with a second RR device (RR2) and a second ABR (ABR2).

As further shown in FIG. 1F, and by reference number 145, the first ABR may advertise a prefix for the first ABR to the first PE device via the other network devices (e.g., via the first RR device). For example, the first ABR may generate a first advertisement that includes a service prefix (e.g., Y and a next hop ABR1 loopback), and a SID (e.g., B:5:DT46::). The first ABR may provide the first advertisement to the first RR device and the first RR may generate a second advertisement based on the first advertisement. The second advertisement may include the service prefix (e.g., Y and a next hop RR1 loopback) and a SID (e.g., B:RR1:DB6::). The SID in the second advertisement may include a SID type (e.g., END.DB6) that provides virtual private network (VPN) option B support for SRv6. The SID type may cause a network device to decapsulate a received SRv6 header of a packet and encapsulate a new SRv6 header on the packet. The first RR device may provide the second advertisement to the first PE device. As further shown in FIG. 1F, and by reference number 150, the first PE device may receive the second advertisement, with the prefix for the first ABR, from the first RR device.

As further shown in FIG. 1F, and by reference number 155, the first PE device may provide a packet, destined for the first ABR, to the first RR device. For example, the first PE device may receive the packet from the endpoint device. The packet may be destined for the server device, via the first ABR. The packet may include a source address (e.g., X) and a destination address (e.g., Y) and a header that includes a source address (e.g., PE1) and a first destination address (e.g., B:RR1:DB6). The first SRH may be associated with the SID type (e.g., END.DB6). The first PE device may provide the packet to the first RR device.

As further shown in FIG. 1F, and by reference number 160, the first RR device may decapsulate the packet, may encapsulate the packet with a source address as the first RR device, and may forward the encapsulated packet to the first ABR. For example, the first RR device may determine that the header of the packet is associated with the SID type (e.g., END.DB6) that provides VPN option B support for SRv6. The SID type may cause the first RR device to decapsulate the SRv6 header of the packet and to encapsulate a new SRv6 header on the packet. The new SRv6 header of the packet may include a source address of the first RR device and a destination address (e.g., B:5:DT46::). The first RR device may forward the packet with the new SRv6 header to the first ABR. The first ABR may receive the packet with the new SRv6 header and may decapsulate the packet to remove the new SRv6 header. The first ABR may forward the packet on to a final destination (e.g., the server device).

Figure 1G:
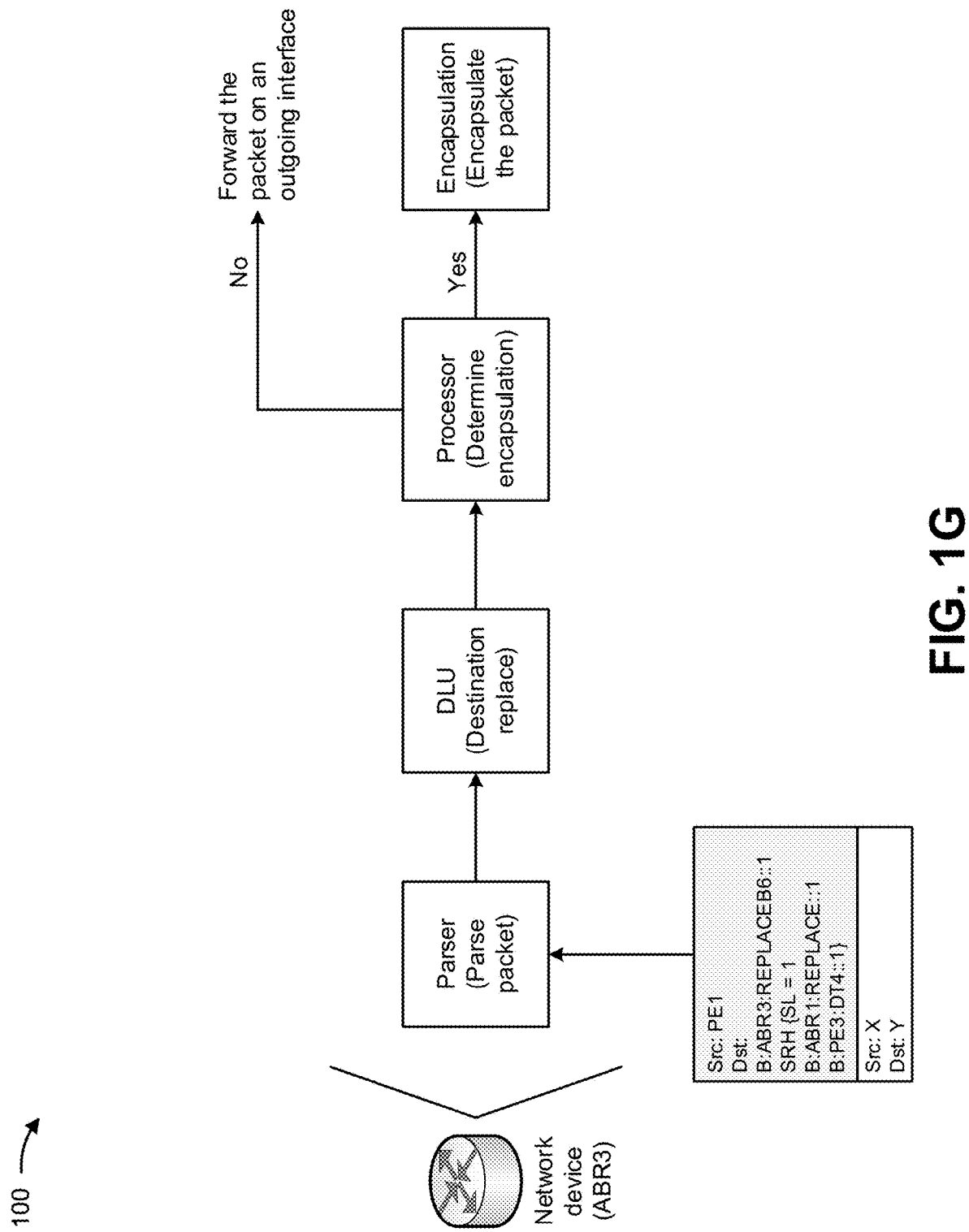

FIG. 1G is a diagram depicting how a network device (e.g., the third ABR) processes a packet on a data plane. As shown, a parser component of the network device may receive the packet and may parse the packet. The parser component may provide the parsed packet to a destination lookup (DLU) component of the network device. The DLU component may replace a destination address of the parsed packet with the first SID or the second SID. The DLU component may provide the parsed packet, with the replaced destination address, to a processor component of the network device. The processor component may determine whether encapsulation is required for the parsed packet, based on the SID provided in the destination address. If the first SID is provided in the destination address, the processor component may determine that encapsulation is not required and may forward the packet on an outgoing interface of the network device. If the second SID is provided in the destination address, the processor component may determine that encapsulation is required and may forward the packet to an encapsulation component of the network device. The encapsulation component may encapsulate the packet and may forward the encapsulated packet toward the destination address.

In this way, the network device provides SIDs that support E2E segment routing with color extended community and BGP VPN option B. A first SRv6 SID (e.g., an END.REPLACEB6 SID) may cause the network device to replace a destination address with a new SID and to encapsulate a new SRv6 header. A second SRv6 SID (e.g., an END.REPLACE SID) may cause the network device to replace a destination address with a new SID and to forward a packet on an outgoing interface. A third SRv6 SID (e.g., an END.DB6 SID) may cause the network device to decapsulate a received SRv6 header and to bind (e.g., encapsulate) a new SRv6 header. The SIDs provided by the network device adhere to several end-to-end constraints associated with providing a seamless segment routing path. Thus, the network device conserves computing resources, networking resources, and/or the like that would otherwise have been consumed by delaying traffic transmission through a network due to the seamless segment routing path, losing traffic due to the seamless segment routing path, handling the lost traffic caused by the seamless segment routing path, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
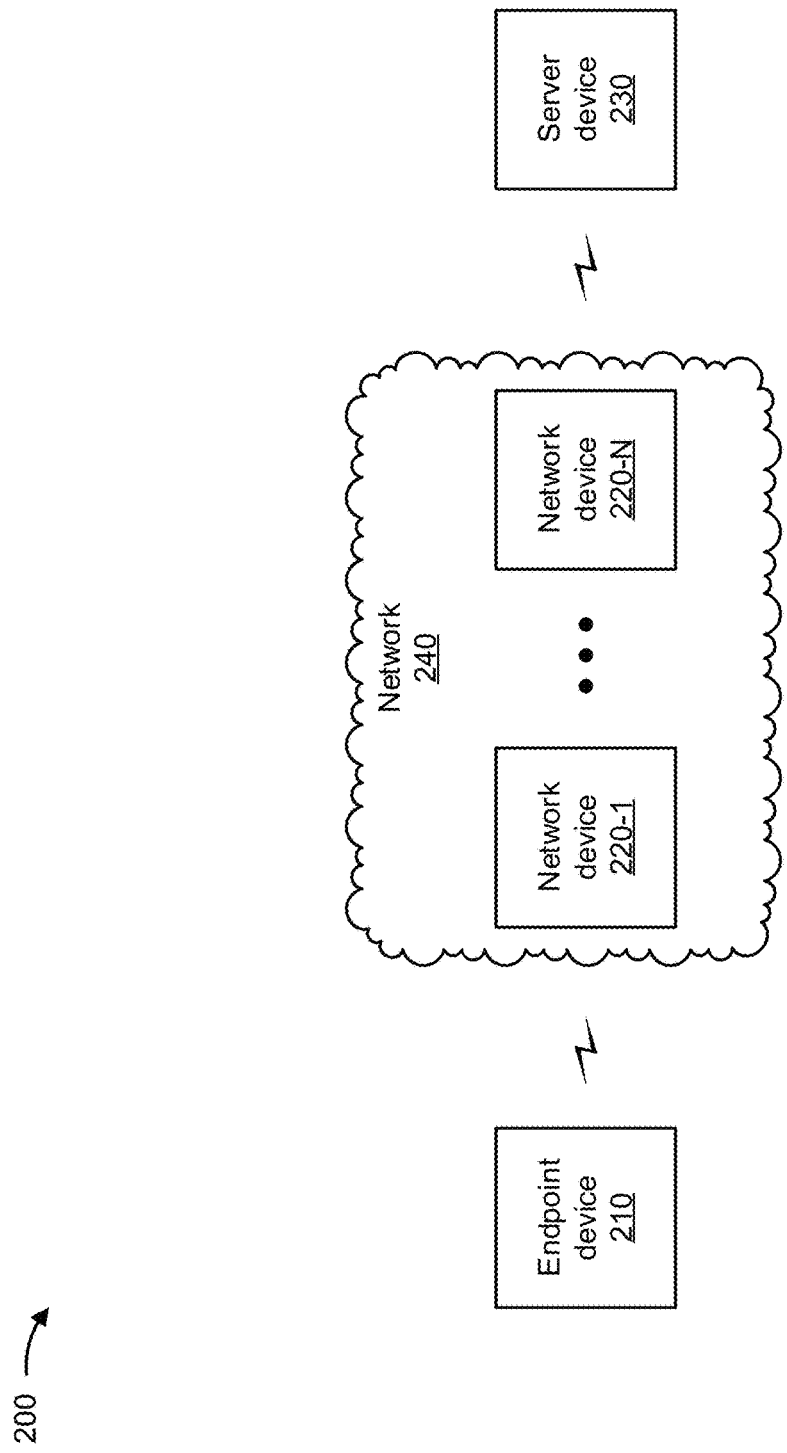
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 includes one or more devices capable of receiving, generating, storing, processing, and/or providing information, such as information described herein. For example, the server device 230 may include a laptop computer, a tablet computer, a desktop computer, a group of server devices, or a similar type of device, associated with multicast traffic. In some implementations, the server device 230 may receive information from and/or transmit information (e.g., multicast traffic) to the endpoint device 210, via the network 240 (e.g., by routing packets using the network devices 220 as intermediaries).

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
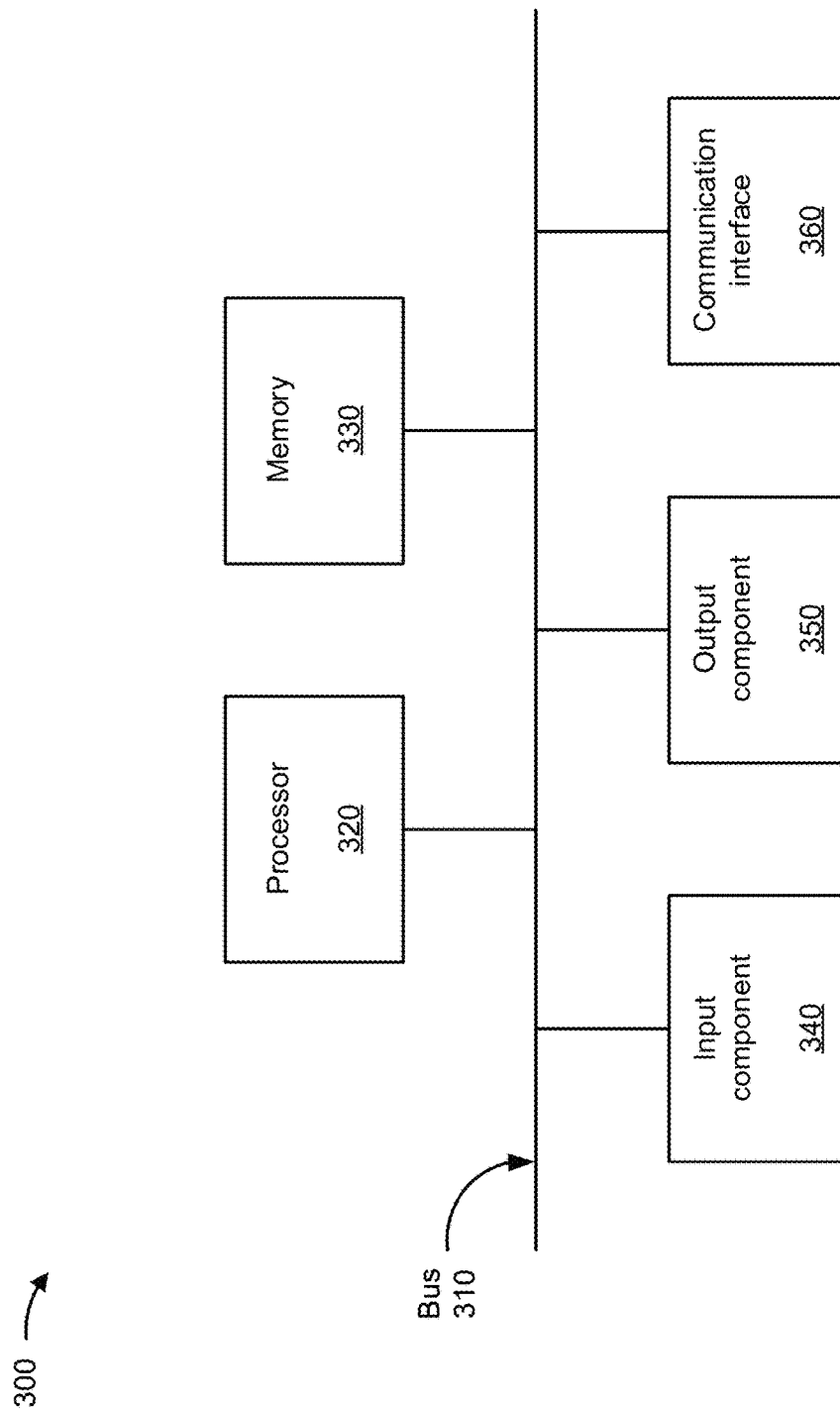
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
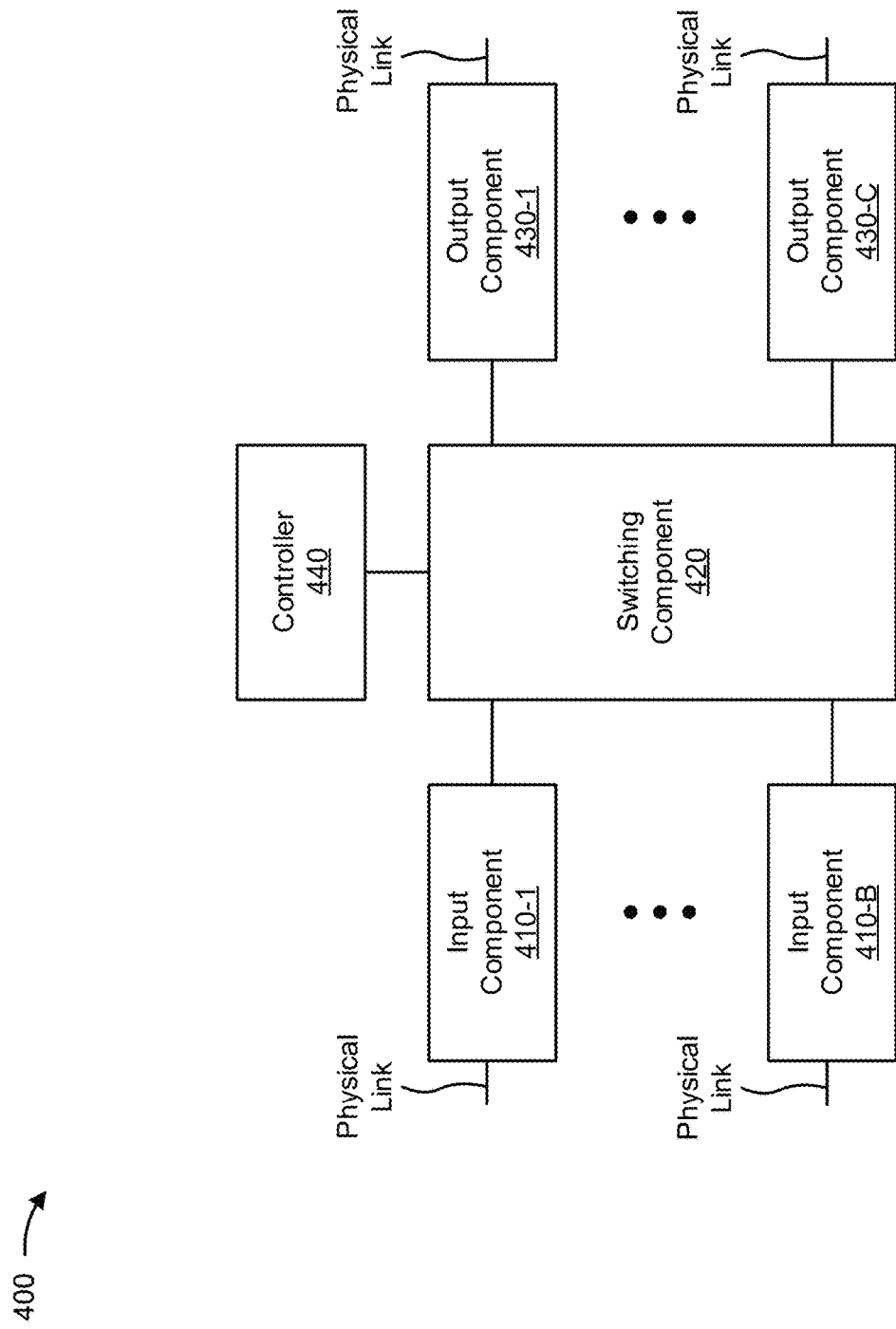

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
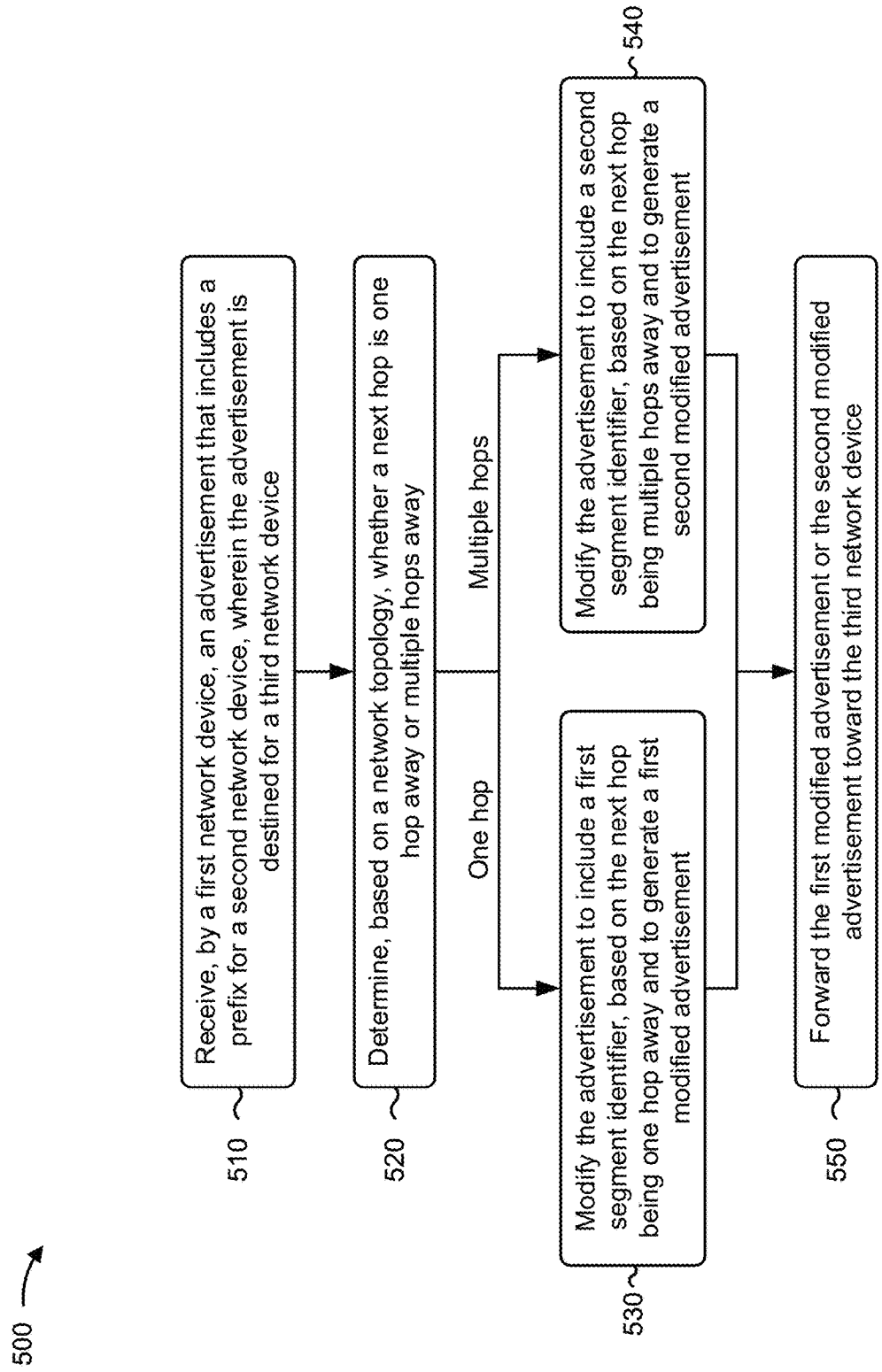
FIG. 5 is a flowchart of an example process for associated with providing SIDs that support E2E segment routing with color extended community and BGP VPN option B.

FIG. 5 is a flowchart of an example process 500 for providing SIDs that support E2E segment routing with color extended community and BGP VPN option B. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving an advertisement that includes a prefix for a second network device, where the advertisement is destined for a third network device (block 510). For example, the first network device may receive an advertisement that includes a prefix for a second network device, as described above. In some implementations, the advertisement is destined for a third network device. In some implementations, the first network device is an area border router, and each of the second network device and the third network device is a provider edge router. In some implementations, the first network device is provided in a core network, the second network device is provided in a first metropolitan area network, and the third network device is provided in a second metropolitan area network.

As further shown in FIG. 5, process 500 may include determining, based on a network topology, whether a next hop is one hop away or multiple hops away (block 520). For example, the first network device may determine, based on a network topology, whether a next hop is one hop away or multiple hops away, as described above.

As further shown in FIG. 5, process 500 may include selectively modifying the advertisement to include a first segment identifier, based on the next hop being one hop away and to generate a first modified advertisement (block 530), or modifying the advertisement to include a second segment identifier, based on the next hop being multiple hops away and to generate a second modified advertisement (block 540). For example, the first network device may selectively modify the advertisement to include a first segment identifier, based on the next hop being one hop away and to generate a first modified advertisement, or modify the advertisement to include a second segment identifier, based on the next hop being multiple hops away and to generate a second modified advertisement, as described above. In some implementations, each of the first segment identifier and the second segment identifier is a segment routing version 6 segment identifier.

As further shown in FIG. 5, process 500 may include forwarding the first modified advertisement or the second modified advertisement toward the third network device (block 550). For example, the first network device may forward the first modified advertisement or the second modified advertisement toward the third network device, as described above.

In some implementations, process 500 includes receiving a packet transmitted by the third network device and destined for the second network device; determining that the packet is associated with the first segment identifier; updating a destination address of the packet to include the second segment identifier based on determining that the packet is associated with the first segment identifier; and forwarding the packet on an outgoing interface toward the second network device.

In some implementations, process 500 includes determining, based on the network topology, whether a next hop limit is less than or equal to one; discarding the packet when the next hop limit is less than or equal to one; and decrementing the next hop limit by one when the next hop limit is greater than one.

In some implementations, process 500 includes receiving a packet transmitted by the third network device and destined for the second network device; determining that the packet is associated with the second segment identifier; updating a destination address of the packet to include the first segment identifier based on determining that the packet is associated with the second segment identifier; encapsulating the packet to generate an encapsulated packet; and forwarding the encapsulated packet toward the second network device. In some implementations, encapsulating the packet includes generating a header with a segment routing header, and providing data identifying a security association, a destination address, a payload length, a traffic class, a hop limit, flow label fields, and a next hop value in the header. In some implementations, forwarding the encapsulated packet toward the second network device includes providing the encapsulated packet to an Internet protocol version 6 (IPv6) module of the first network device, wherein the IPV6 module transmits the encapsulated packet toward the second network device.

In some implementations, process 500 includes receiving another advertisement that includes another prefix for a fourth network device, wherein the other advertisement is destined for the third network device; modifying the other advertisement to include a third segment identifier; and forwarding the other advertisement, as modified, toward the third network device. In some implementations, the third segment identifier is associated with virtual private network option B support for segment routing over Internet protocol version 6.

In some implementations, process 500 includes receiving a packet transmitted by the third network device and destined for the fourth network device; decapsulating the packet, encapsulating the packet, with a source address as the first network device, to generate an encapsulated packet; and forwarding the encapsulated packet toward the fourth network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A non-transitory computer-readable medium storing a set of instructions, the set of instructions comprising:
    one or more instructions that, when executed by one or more processors of a first network device, cause the first network device to:
        selectively:
            modify an advertisement to include a first segment identifier, based on a next hop being one hop away, or
            modify the advertisement to include a second segment identifier, based on the next hop being multiple hops away;
        forward the modified advertisement with either the first segment identifier or the second segment identifier toward a second network device;
        receive a packet transmitted by the second network device and destined for a third network device;
        update a destination address of the packet to include the second segment identifier when the packet is associated with the first segment identifier; and
        forward the packet toward the third network device,
            wherein the first network device provides segment identifiers (SIDs) that support end-to-end (E2E) segment routing with color extended community.

2. The non-transitory computer-readable medium of claim 1, wherein the one or more instructions further cause the first network device to:
    encapsulate the packet to generate an encapsulated packet; and
    wherein the one or more instructions, that cause the first network device to forward the packet toward the third network device, cause the first network device to:
        forward the encapsulated packet toward the third network device.

3. The non-transitory computer-readable medium of claim 1, wherein the first segment identifier and the second segment identifier adhere to a plurality of end-to-end constraints associated with providing a seamless segment routing path.

4. The non-transitory computer-readable medium of claim 1, wherein the first network device further provides the SIDS with border gateway protocol (BGP) virtual private network (VPN) option B.

5. The non-transitory computer-readable medium of claim 1, wherein the advertisement includes a prefix for the third network device.

6. The non-transitory computer-readable medium of claim 1, wherein the one or more instructions further cause the first network device to:
    encapsulate the packet with an encapsulation header,
        wherein the encapsulation header includes one or more of:
            a source address,
            the destination address, or
            a segment routing header.

7. The non-transitory computer-readable medium of claim 1, wherein the one or more instructions further cause the first network device to:
    determine whether a next hop limit is less than or equal to one;
    discard the packet when the next hop limit is less than or equal to one; and
    decrement the next hop limit by one when the next hop limit is greater than one.

8. A first network device, comprising:
    one or more memories; and
    one or more processors to:
        receive an advertisement destined for a second network device;
        when a next hop is one hop away, modify the advertisement to include a first segment identifier;
        when the next hop is multiple hops away, modify the advertisement to include a second segment identifier;

forward the modified advertisement with either the first segment identifier or the second segment identifier toward the second network device;

receive a packet transmitted by the second network device and destined for a third network device;

update a destination address of the packet to include the second segment identifier when the packet is associated with the first segment identifier; and forward the packet toward the third network device, wherein the first network device provides segment identifiers (SIDs) that support end-to-end (E2E) segment routing with color extended community.

9. The first network device of claim 8, wherein the one or more processors are further to:

determine when the next hop is one hop away or multiple hops away based on a network topology.

10. The first network device of claim 8, wherein the first network device further provides the SIDS with border gateway protocol (BGP) virtual private network (VPN) option B.

11. The first network device of claim 8, wherein a type of segment identifier causes the packet to be decapsulated and then encapsulated with a different source address.

12. The first network device of claim 11, wherein the one or more processors, to encapsulate the packet, are to:

encapsulate the packet with an encapsulation header to generate an encapsulated packet, wherein the encapsulation header includes one or more of:
  a source address,
  the destination address, or
  a segment routing header.

13. The first network device of claim 8, wherein the first network device is an area border router, and each of the second network device and the third network device is a provider edge router.

14. The first network device of claim 8, wherein the one or more processors are to:

determine whether a next hop limit is less than or equal to one;

discard the packet when the next hop limit is less than or equal to one; and decrement the next hop limit by one when the next hop limit is greater than one.

15. A method, comprising:

receiving, by a device, an advertisement destined for a second network device;

selectively:
  modifying, by the device, the advertisement to include a first segment identifier, based on a next hop being one hop away; or
  modifying, by the device, the advertisement to include a second segment identifier, based on the next hop being multiple hops away;

forwarding, by the device, the modified advertisement with the first segment identifier or the second segment identifier toward the second network device;

receiving, by the device, a packet destined for a third network device;

updating, by the device, destination address of the packet to include the second segment identifier when the packet is associated with the first segment identifier; and forwarding, by the device, the packet toward the third network device,
  wherein the device provides segment identifiers (SIDs) that support end-to-end (E2E) segment routing with color extended community.

16. The method of claim 15, wherein the advertisement includes a service prefix.

17. The method of claim 15, wherein a type of segment identifier causes the packet to be decapsulated and then encapsulated with a different source address.

18. The method of claim 15, further comprising:

generating a header with a segment routing header; and providing data identifying a security association, a payload length, a traffic class, a hop limit, flow label fields, and a next hop value in the header; and wherein forwarding the packet comprises:
  forwarding the packet with the data in the header.

19. The method of claim 15, further comprising:

updating the destination address of the packet to include the first segment identifier when the packet is associated with the second segment identifier; and forwarding, by the device, the packet toward the third network device.

20. The method of claim 15, wherein the modified advertisement with the first segment identifier is different than the modified advertisement for the second segment identifier.

* * * * *